United States Patent [19]
Chang et al.

[11] Patent Number: 5,173,238
[45] Date of Patent: Dec. 22, 1992

[54] METHOD FOR INJECTION MOLDING A TRANSACTION TERMINAL CASE

[75] Inventors: Karl Chang, Honolulu; William R. Pape, III, Papaaloa; Victor J. Crosetti, Jr., Honolulu; Lance S. Nakamura, Pearl City; Daniel B. C. Leong; Robert K. L. Loui, both of Honolulu, all of Hi.

[73] Assignee: Verifone, Inc., Redwood City, Calif.

[21] Appl. No.: 682,982

[22] Filed: Apr. 10, 1991

Related U.S. Application Data

[60] Division of Ser. No. 276,914, Nov. 28, 1988, Pat. No. 5,019,696, which is a division of Ser. No. 85,287, Aug. 10, 1987, Pat. No. 4,788,420, which is a continuation of Ser. No. 770,725, Aug. 28, 1985, abandoned.

[51] Int. Cl.$^5$ .................. B29C 45/00; B29C 71/00
[52] U.S. Cl. .................. 264/232; 264/328.1; 264/336
[58] Field of Search .................. 264/328.1, 336, 236, 264/232; 249/145; 425/577, 468

[56] References Cited

U.S. PATENT DOCUMENTS

| | | | |
|---|---|---|---|
| 2,104,673 | 1/1938 | Rieser | 264/237 |
| 3,166,795 | 1/1965 | Joffe | 425/468 |
| 4,585,929 | 4/1986 | Brown et al. | 235/482 |

*Primary Examiner*—James Lowe
*Attorney, Agent, or Firm*—Lowell C. Bergstedt

[57] ABSTRACT

A method for injection molding a transaction terminal case with an integral card slot formed by a knife blade in the female mold section which is supported against twisting during the molding process by a plurality of narrow buttress sections in the male mold section. The male mold section also includes a structural element in the form of a larger central buttress which contacts the knife blade of the female mold section cooperatively to form a read head window in one side of the integral card slot during the molding process. The male mold section further includes structural elements for forming a bracket mounting arrangement which is integrally formed adjacent the read head window during the injection molding process.

10 Claims, 4 Drawing Sheets

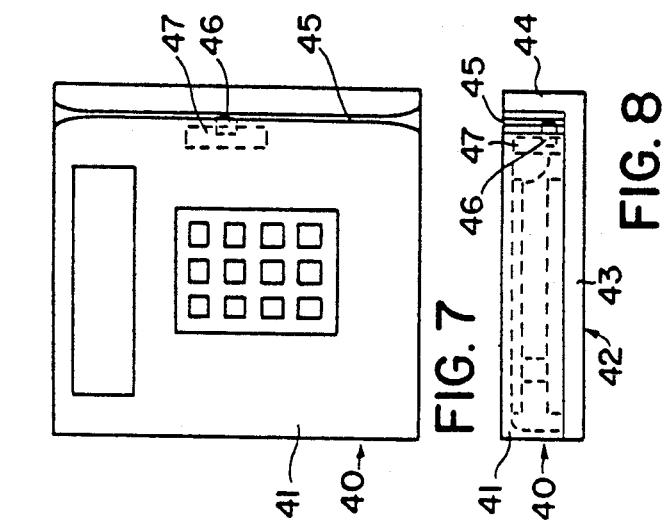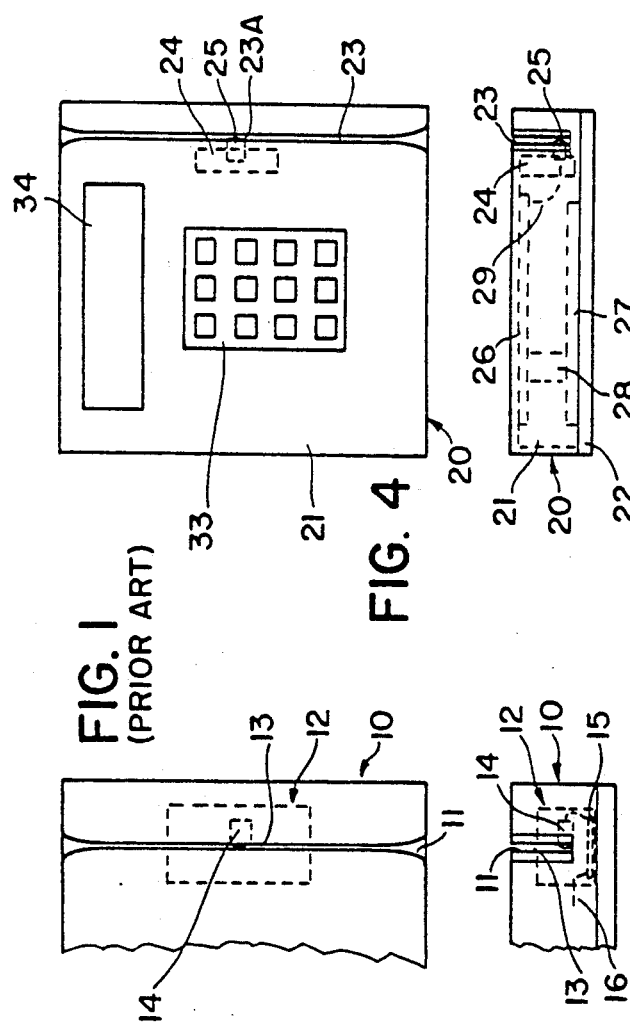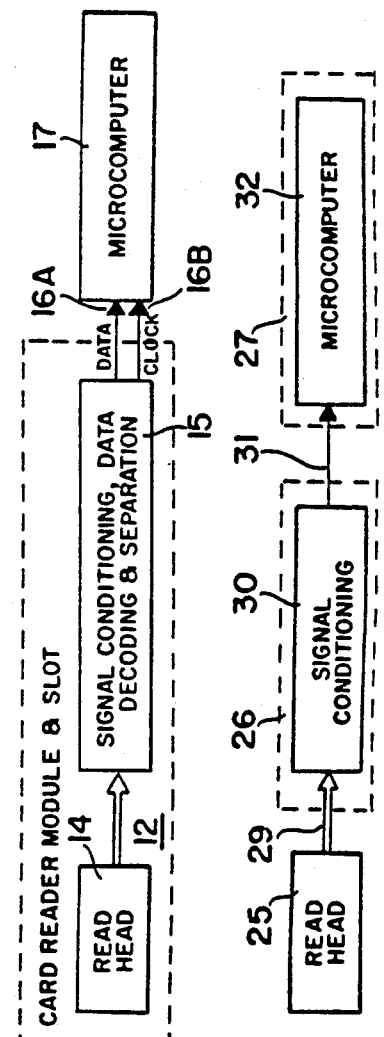

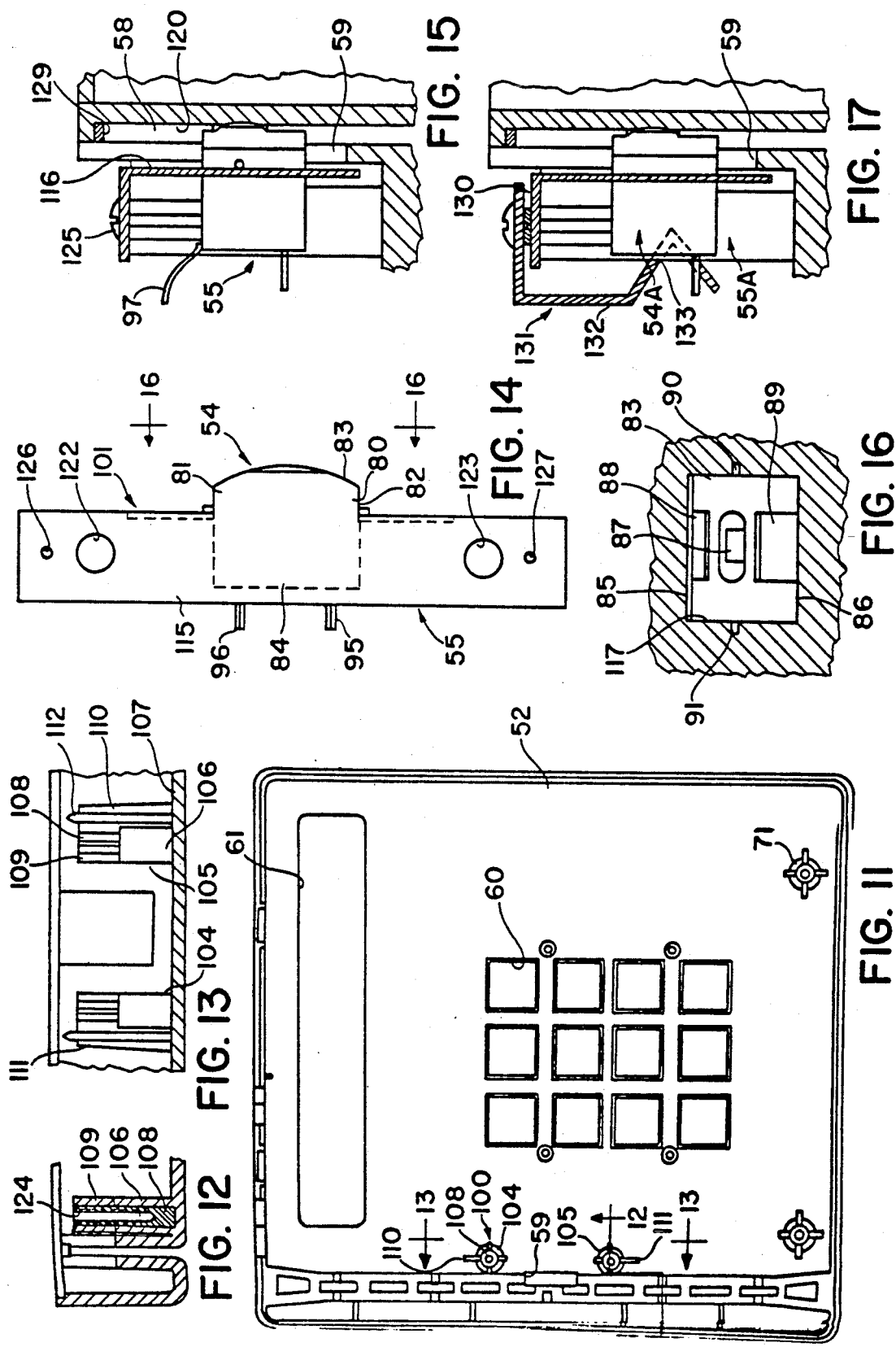

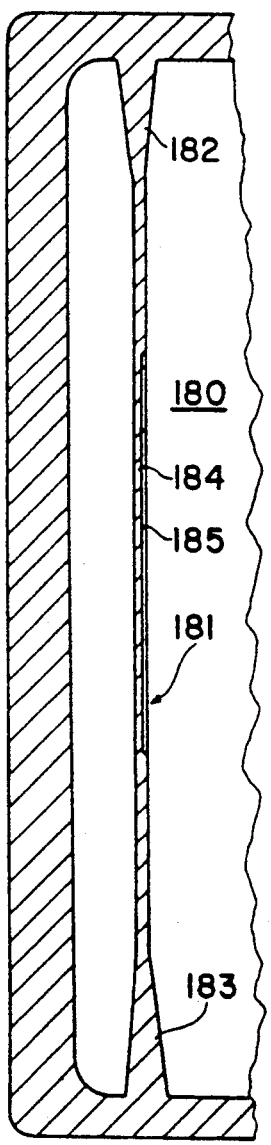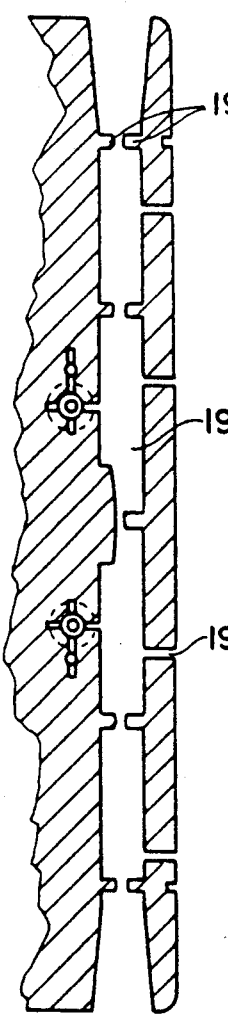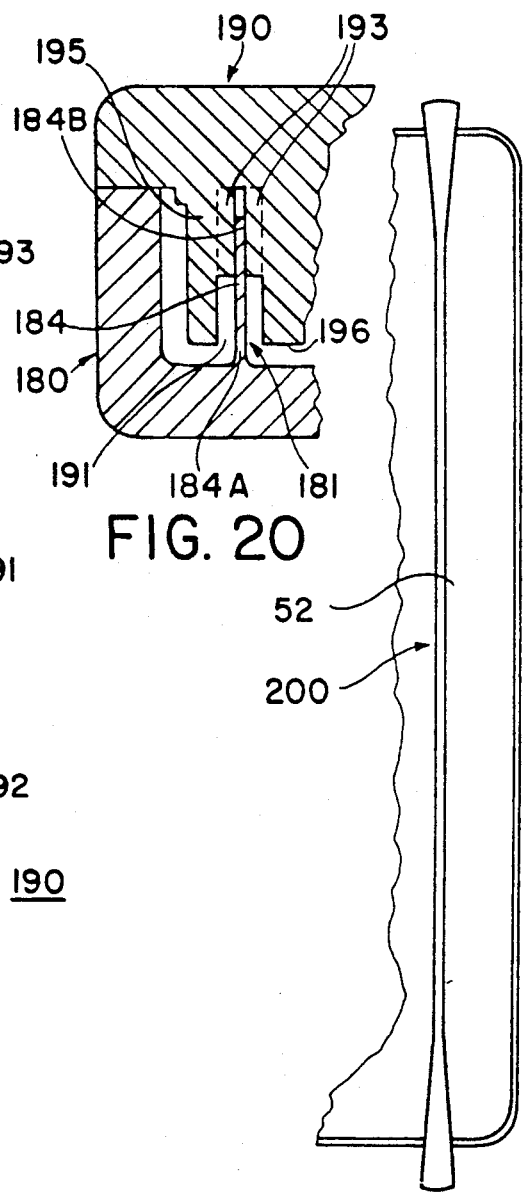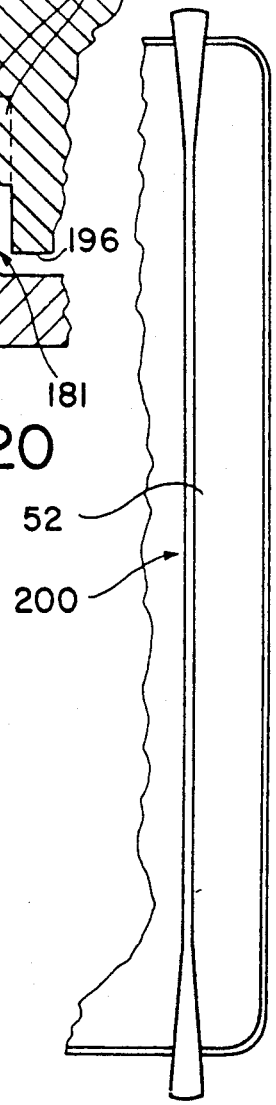
FIG. 18
FIG. 19
FIG. 20
FIG. 21

METHOD FOR INJECTION MOLDING A TRANSACTION TERMINAL CASE

CROSS REFERENCE TO RELATED APPLICATIONS

This application is a divisional of my copending U.S. application Ser. No. 07/276,914, filed Nov. 28, 1988 (now U.S. Pat. No. 5,019,696), which is a divisional of my copending U.S. application Ser. No. 07/085,287 filed Aug. 10, 1987 (now U.S. Pat. No. 4,788,420), which is a continuation of copending U.S. application Ser. No. 06/770,725, filed Aug. 28, 1985 (now abandoned).

FIELD OF THE INVENTION

This invention relates generally to methods of constructing a credit card verification terminal, and to methods for injection molding a card reader case with an integral card slot.

BACKGROUND AND PRIOR ART

Substantial performance improvements and cost reductions in integrated circuits for the microcomputer and telecommunications fields have been made in recent years. These improvements in cost/performance have made it economically attractive to mass produce certain system applications of this technology at affordable prices. One such area of application is the point of sale terminal for credit verification of a credit cardholder wishing to make a purchase.

Until recently, retail establishments, such as stores and restaurants, could not afford to take the time and effort to verify credit for purchases of goods or services having a small dollar value. Credit verification involved making a phone call to a credit verification office, waiting for some lesser or greater time period to be connected to a person at the office, and then verbally giving the credit card number and awaiting the authorization code for the transaction. Consequently, only credit card purchases which totalled more than a certain amount were subject to credit verification and these transactions often tied up sales or checkout clerks for substantial periods of time and made customers unhappy about the wait.

The problems of credit verification resulted in losses to the retail merchants from unauthorized credit card usage and less than enthusiastic reception of credit card usage for large purchases in busy stores. Within the past few years, point of sale terminals tied on a telecommunications basis to a central computer for credit verification have begun to make a large impact on retail merchants. Initially these terminals were very large, quite expensive, and thus not very affordable to the average merchant. Some of the terminals required many of the same steps to be performed that manual credit verification required, i.e. the manual placing of a phone call to the computer and manual entry of the credit card number and the other transaction data.

Gradually the performance of the prior art terminals increased as more microcomputer power and telecommunications capability with autodialing were introduced into the terminals and as card stripe reader capability was provided. All of these improvements made use of the terminal more automatic and completing the credit verification task more time efficient. Still the size of the prior art terminals was large, making it difficult to find room on crowded checkout and cash register counters for another piece of equipment. Also the units were still quite expensive, limiting the size of retail establishment which could cost justify the terminal and the on-line telecommunications costs associated with it. Clearly, the limitations of prior art terminals impedes more wide spread acceptance of the point of sale, on line credit verification terminals and improvements are needed to make this technology cost effective for, and attractive to, the large population of small retail establishments.

OBJECTS OF THE INVENTION

It is another object of this invention to provide a lower cost technology for the manufacture of credit verification terminals.

FEATURES AND ADVANTAGES OF THE INVENTION

Another aspect of this invention features a method for injection molding a card reader case with an integrally molded card slot. The method includes forming a female mold section defining the outer front and side wall configuration of the case and including a thin knife blade element extending from one end wall to the other and partially through the mold section to define the outer bottom and side walls of the card slot. Another step involves forming a male mold section having one portion defining the inner front and side wall configuration of the case and a second portion defining the inner side and bottom walls of the card slot, including defining the configuration of a read head window in one of the side walls of the card slot. This second portion of the male mold section includes a plurality of narrow buttress sections regularly spaced from one end to the other on opposite sides of the second portion. These buttress sections are adapted to contact opposite edges of the knife blade when the male mold section is mated with the female mold section.

The process then involves bringing the male and female mold sections together in mating relationship and injecting plastic material into void regions within the mated mold sections. The buttress portions defined on the male mold section support the knife blade during the injection process to prevent distortion thereof and thereby to produce a well formed straight card slot in the molded case with narrow fenestrations corresponding to the buttress sections of the male mold section.

Preferably the male and female mold sections are ejected after the injected plastic material has partially cured, the molded case is ejected from the mold, and a conforming insert is placed into the card slot while the case is curing to final hardness in air to preclude distortion of the card slot.

This method of injection molding of the case provides a high quality and reproducibility of the integral card slot in the case. This feature is critical to the achievement of low cost manufacturing of a high quality system. Other approaches to implementing the general feature of this invention of a card slot defined entirely by the molded case and not by a separate card reader module can be utilized. One such other approach involves molding one wall of the card slot in one piece of the case and molding the bottom wall and the other side wall from another piece of the case such that the full card slot is defined when the two pieces or sections are mounted together. This is less advantageous and more difficult to control from a quality standpoint but still provides the main advantages of the invention.

Other objects, features and advantages of this invention, together with a more complete understanding of those discussed above, will be learned from a consideration of the following detailed description in conjunction with the accompanying drawings.

BRIEF DESCRIPTION OF DRAWINGS

FIGS. 1-3 are schematic drawings depicting prior art card reader technology.

FIGS. 4-8 are schematic drawing depicting card reader features in accordance with this invention.

FIG. 11 is a back plan view of a cover of a case for a terminal incorporating the features of this invention.

FIG. 12 is a partial section view taken along the lines 12—12 in FIG. 11.

FIG. 13 is a partial view taken along the lines 13—13 in FIG. 11.

FIG. 14 is a top plan view of a read head mounting arrangement in accordance with this invention.

FIG. 15 is a section view of a read head mounting arrangement in accordance with this invention.

FIG. 16 is a partial view of a read head mounting arrangement in accordance with this invention.

FIG. 17 is a section view of an alternative embodiment of a read head mounting arrangement in accordance with this invention.

FIGS. 18-21 are drawings illustrating features of an injection molding process in accordance with this invention.

DETAILED DESCRIPTION OF EMBODIMENTS

Figure 10:
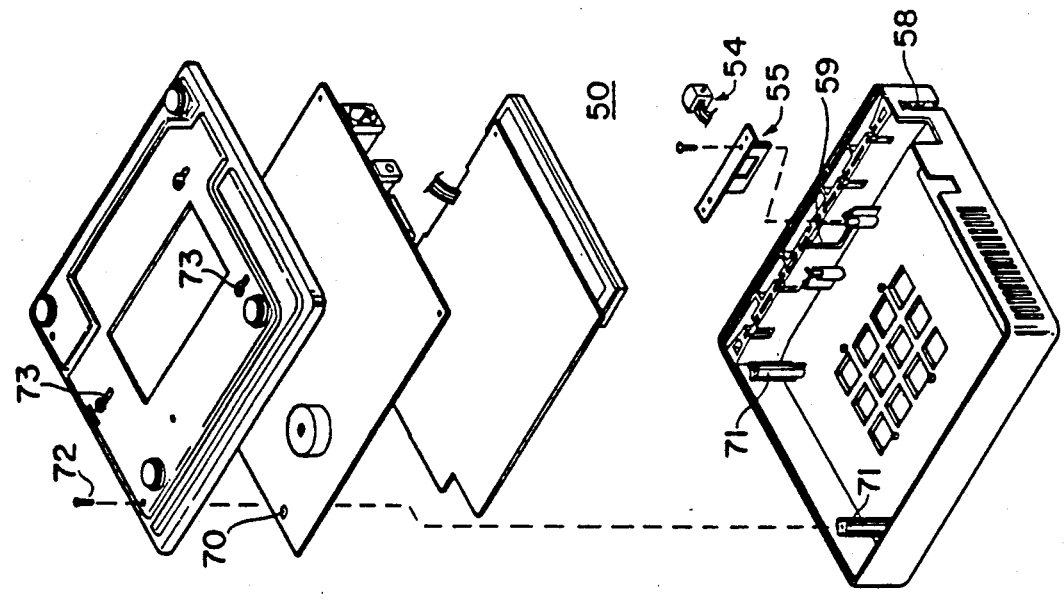
FIGS. 9 and 10 are exploded isometric views of the main elements of a point of sale card reader terminal incorporating features of this invention.

Referring now to FIGS. 1-3, the general structure and operation of a card reader used in prior art point of sale credit verification terminals will be described. The card reader case 10 defines a partial card slot 11 and in the central portion of the card slot a card reader module 12 having its own integral slot 13 is mounted. A magnetic read head assembly 14 is provided in the card reader module. The output of the read head assembly is coupled to a circuit 15 which performs signal conditioning and data decoding and clock separation on the output signals from the read head 14. The output signals on output leads 16A and 16B are data bytes in ASCII format and clock signals which are received by microcomputer 17 for processing the card data.

As discussed above, the use of a separate card reader module with its own card slot adds substantially to the cost of manufacture of the credit verification terminal. These costs are due to the cost of the module with internal circuitry and to the assembly cost for mounting the separate module in the case.

FIGS. 4, 5 and 6 illustrate generally the structure and operation of a preferred embodiment of a data card reading system and method in accordance with this invention, which has particularly advantageous application in a point of sale credit verification terminal. The terminal includes a case 20 which comprises a cover 21 and a base portion 22. Preferably, the cover portion 21 defines an integral card slot 23 which extends along the right hand side of the cover 21 close to the right hand edge. Cover portion 21 defines the entire right and left sidewalls of card slot 23 as well as the bottom wall thereof. A read head window designated 23A is defined in the left side wall of the card slot 23.

Adjacent the read head window 23A is formed a mounting arrangement 24 for mounting a magnetic read head assembly 25 in an appropriate vertical position in the read head window 23A. The details of this read head mounting arrangement are depicted in other drawing figures and will be described below. Preferably, the read head mounting arrangement 24 includes positioning and locating elements which are integrally formed with cover 21.

Output signals from read head 25 are coupled via signal lines 29 to a circuit board 26. On circuit board 26, signal conditioning circuits 30 are provided to convert these output signals to a square wave signal. Circuit board 26 also has mounted thereon a keypad 33 and a multi-element display 34. Appropriate apertures are defined in the top wall of the cover 21 for the keypad 33 and the display 34.

A second circuit board 27 includes microcomputer circuitry 32 and is coupled by way of a cable, shown schematically in FIG. 5 and designated 28, to the circuit board 26. As shown in FIG. 6, the square wave output signal 31 from signal conditioning circuit 30 is fed to the microcomputer 32 for data decoding and other processing under software control. The details of this operation will be discussed below.

The main advantage of the system shown in FIG. 4 is the cost reduction achieved by defining the entire card slot 23 in the cover 21 of the case. A simple mounting arrangement is provided for the magnetic read head assembly, resulting in low manufacturing cost due to ease of assembly, simplicity and low component cost. Simple and inexpensive signal conditioning circuitry 30 is provided, with the main workhorse tasks of data decoding and processing being performed by microcomputer 32 under program control. Since the microcomputer is provided for performing other tasks and can be programmed in accordance with this invention to perform data decoding and processing tasks in a simple and effective manner, substantial savings in eliminating dedicated circuit costs are achieved.

The central feature of this invention, namely that of having the case of the defining the entire card slot in combination with a simplified mounting arrangement for a low cost magnetic read head can be achieved in other embodiments, such as the one shown in FIGS. 7 and 8. In this embodiment, the case 40 comprises a cover 41 and a base portion 42. Base portion 42 includes a bottom portion 43 and a section 44 which defines the bottom and right side walls of the card slot 45. The left side wall of card slot 45 is defined by the cover 41. Mounting arrangement 47 for read head assembly 46 may be the same as in the embodiment shown in FIGS. 4 and 5. All other aspects of the overall system are essentially the same as the embodiment of FIGS. 4 and 5 and need not be described here. The use of two separate portions of the case 40 to define the entire card slot 45 may make it more difficult to maintain tolerance on the configuration of the card slot 45 and may not provide the same level of manufacturing cost advantage as is provided by the preferred embodiment.

Figure 9:
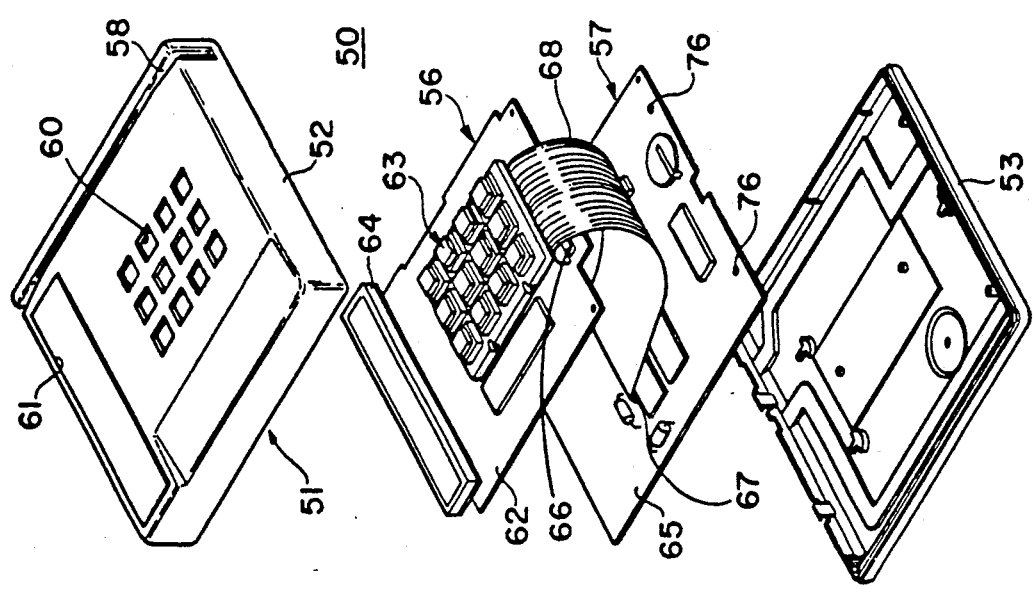

It should be apparent that there are also other approaches to forming the overall case of the terminal such that the case defines the entire card slot in accordance with the principles of this invention. For example, separate left and right portions of the case adjacent the card slot could be combined with a totally separate base section, each of which separately defines left, right and bottom walls of the card slot. Each additional piece involved in defining the card slot will of course add additional manufacturing cost and complexity to assembly of the case. However, all of these approaches will provide some substantial improvement over the prior art systems. FIGS. 9 and 10 illustrate with exploded isometric views the simplified assembly of components of a credit verification terminal in accordance with this invention. The terminal 50 includes a case generally designated 51 which comprises a cover 52 and a base 53. The other modules of the terminal 50 are two circuit board assemblies 56 and 57, read head assembly 54, and read head mounting arrangement 55 which mounts the read head assembly 54 in the cover 52. These two circuit boards and other modules are mounted within the enclosure defined by the cover 52 and base 53.

Cover 52 itself defines an entire card slot 58 and a read head window 59 in the left side wall thereof. The details of the card slot 58, the read head window 59 and other aspects of the mounting arrangement for the read head assembly will be described below in conjunction with enlarged and section views.

Cover 52 also defines the two-dimensional array of apertures 60 in a central portion of the top of the cover and a rectangular display aperture 61 which may be covered with a transparent plastic sheet. Printed circuit module 56 includes a circuit board 62, and a keypad assembly 63 with individual keys which are received in the apertures 60 in the cover 52. The multi-element display 64 is mounted on the circuit board 62 and is received in the display aperture 61 of the cover 52.

Printed circuit module 57 includes a circuit board 65 with a number of microcomputer and other circuit components formed thereon. A connector 66 is provided on board assembly 56 and a connector 67 is provided on board assembly 57, with ribbon cable 68 coupled therebetween to provide power supply and data and control signal communication between the two board assemblies.

Board assembly 56 is mounted to the underside of the top wall of cover 52 using any convenient fastening arrangement. Board assembly 57 has a bottom section with mounting apertures 70 therein which cooperate with the mounting studs 71 and the mounting screws 72 to hold board assembly 57 in place adjacent the base 53. A variety of other mounting arrangements could readily be provided for this overall assembly.

The terminal 50 can readily be manufactured to have a desk footprint about the size of a standard desk telephone, for example with dimensions of 14×15.2 centimeters. The position of the card slot 58 at the right side of the case 51 provides a convenient card wiping location for persons using the terminal, most of whom will be right handed. Mounting slots 73 in the base 53 provide capability for mounting the terminal 50 on a wall if desired.

Because of the simplicity of the mounting arrangement 55 with the read head assembly 54 located to the left of the integral card slot 58, the portion of the cover 52 between the card slot 58 and the right edgewall of the case can be made very small compared to prior art systems. It will be appreciated that the terminal assembly of this invention features high packing density of the components to achieve the small terminal size, but combines this high packing density with ease of assembly to provide overall low cost of manufacture. The cover 52 and base 53 are injection molded ABS plastic pieces. In particular, cover 52 may be formed utilizing a particular method of injection molding of its features which comprises one aspect of this invention and is described in detail below.

Referring now to FIGS. 11-16 the details of read head assembly 54 and mounting arrangement 55 for read head assembly 54 will be described. Initially a preferred embodiment of read head assembly 54 and mounting arrangement 55 will be described, followed by a description of a modified version depicted in FIG. 17.

Read head assembly 54 includes a housing 80 having side walls 81 and 82, front and back walls 83 and 84, and top and bottom walls 85 and 86. Front wall 83 includes a magnetic read head pickup 87. Undercut regions 88 and 89 are formed in the front wall 83 above and below the pickup head 87. The function of these undercut regions will be described below. Small pins 90 and 91 comprise exterior projections on side walls 82 and 81 spaced a short distance from the front wall 83. Projections 90 and 91 are provided on the axis of the magnetic pickup head 87. These projections provide a gimbal mounting arrangement which will be described below. Signal output pins 95 and 96 extend from the back wall 84 and a housing ground wire 97 is attached to top wall 85 as shown in FIG. 15.

The mounting arrangement 55 for mounting the data read head assembly 54 in read head window 59 utilizes a bracket mounting arrangement 100 which is integrally formed with the cover 52 during the injection molding process. Mounting arrangement 55 also includes a bracket arrangement 101 which holds read head assembly 54 in position in read head window 59 and includes a spring biasing arrangement which engages the read head assembly and biases the read head 87 toward the wall of the card slot 58 opposite the read head window 59.

Preferably, bracket mounting arrangement 100 comprises a pair of screw mounting posts 104 and 105 which are integrally formed with cover 52 in positions adjacent read head window 59. The structure of each of the screw mounting posts 104 and 105 is substantially the same so the details of only one portion will be described in conjunction with FIGS. 12 and 13. Screw mounting post 105 includes a base portion 106 extending from the underside 107 of cover 52. A brass screw insert 108 has a lower portion captured within base 106 as shown in FIG. 12. An arrangement of four buttresses 109 are provided, each extending from base 106 upwards alongside of the threaded insert 108.

Adjacent each of the screw mounting posts 104 and 105 is a location pin arrangement 100 and 111, each of which is integrally molded with the adjacent mounting post in the process of forming cover 52. An upper projecting portion 112 is provided on each location pin arrangement and extends above the top of screw mounting posts 104 and 105. The location pins are buttressed for stability as shown.

Bracket arrangement 101 comprises an integral spring and bracket element having an upper bracket portion 115 which is adapted to be mounted with screws on mounting posts 104 and 105. A lower bracket portion 116 forms with upper bracket portion 115 an L-shaped cross sectional bracket configuration. When the upper bracket element 115 is mounted on screw mounting posts 104 and 105 as shown in FIG. 15, the lower bracket element 116 extends substantially parallel to the side walls of card slot 58 a short distance behind the read head window 59. Lower bracket element 116 has a generally rectangular aperture 117 formed therein to receive read head assembly 54. The side-to-side dimension of aperture 117 is formed to correspond with close tolerance to the side-to-side outer dimension of the read head housing 80 to preclude any substantial lateral movement of the read head assembly in aperture 117. However, the top-to-bottom dimension of aperture 117 is made slightly larger than the top-to-bottom dimension of read head housing 80 to permit read head housing 80 to rotate slightly about the axis defined by projecting pins 90 and 91.

The dimensions of the upper bracket element 115 and lower bracket element 116 are selected relative to the position of the mounting posts 104 and 105 such that the bracket element 101 automatically provides a spring biasing force against the projections 90 and 91, which urges the front face 83 of the read head assembly 54 toward the right side wall 120 of card slot 58, as shown in FIG. 15. Preferably, when no credit card is being wiped across the front of the read head assembly, the spring pressure from lower element 116 urges the front face 83 of the read head assembly into slight pressure contact with the right hand wall 120 of the card slot. This prevents chattering of the read head assembly when no card is being wiped past it in the card slot 58. A slight amount of chatter would not be detrimental to the operation of the read head assembly, but may give a false impression of something loosely rattling in the terminal.

Bracket element 101 is preferably formed from a sheet of stainless steel having a thickness of about 0.2 millimeters. The characteristics of the material used are selected so that the lower element 116 provides inherent spring pressure which keeps the read head 87 against the magnetic stripe on a credit card being wiped past the read head assembly.

Apertures 122 and 123 formed in the upper bracket member 115 cooperate with the threaded internal aperture 124 in each of the brass inserts 108 on mounting posts 104 and 105 to receive a mounting screw 125. Apertures 126 and 127 in upper bracket member 115 cooperate with location posts 112 to position the upper bracket element 115 accurately.

It will be appreciated that a simple assembly operation is required to mount the read head bracket 101 and read head assembly 54 to the cover 52. Read head assembly 54 is inserted in the aperture 117 in bracket member 116, backwall first, and is manually held in position while the upper bracket element 115 is placed in position on the screw mounting posts 104 and 105 with the location posts 112 guiding the upper bracket element 115 into position. Screws 125 are then inserted to permanently mount the bracket arrangement 101 on the mounting posts 104 and 105.

This simple, low cost mounting arrangement is a substantial contributor to the overall low part cost and assembly cost of the terminal 50 depicted in FIGS. 9 and 10. The assembly operation of the other elements of the terminal, including the two circuit boards 56 and 57, have been described above. It should be understood that the entire mounting arrangement for the read head, including the spring biasing bracket arrangement could also be injection molded with the cover of the case.

Referring to FIGS. 15 and 16, it should be apparent that the read head assembly 54 is effectively gimbal mounted around the axis defined by the projections 90 and 91 thereon. The undercut regions 88 and 89 on the front face 83 of the read head housing 80 cooperate with this gimbal mounting arrangement to ensure that the read head pickup 87 will maintain contact with the magnetic data stripe on the credit card being wiped past the read head assembly in the card slot 58, even if a localized warping of the card is present in the region being wiped by the read head. This ensures reliability of detecting the magnetically encoded data pattern on the credit card track.

The particular terminal 50 depicted in the drawings and described thus far comprises a single track reading system for reading track two on a credit card. Track two contains the card number and a few bits of other information such as card expiration date. It should be apparent that the system of this invention could readily be extended to a multiple read head arrangement for reading other tracks on the credit card.

The position of the magnetic pickup head 87 on the front face of read head assembly 54 must be quite accurately controlled relative to the bottom wall 129 of card slot 58 to achieve good signal pickup levels and a good signal-to-noise ratio. It has been found that dimensional tolerances on the positioning of the mounting aperture 117 in the bracket member 101, together with sufficiently accurate dimensional tolerances on the formation of the screw mounting posts 104 and 105 for the bracket element 101, can be achieved by careful attention to forming the male and female mold elements in the injection molding process.

Referring to FIG. 17, an alternative version of an integral bracket and spring mounting means is disclosed. In this embodiment the bracket arrangement comprises a first bracket element 130 which has a shape similar to the integral spring and bracket element depicted in FIGS. 14 and 15, but the aperture therein simply holds the read head assembly 54A in vertical and horizontal position without applying any spring biasing force thereto. The axial projections 90 and 91 which are present on the read head assembly 54, depicted in FIGS. 14 and 16 are not provided on read head assembly 54A. Instead, a second bracket member 131 provides the spring biasing pressure at point 133, applied through a bracket member 132 to the backwall of the housing of read head assembly 54A.

Read head assembly 54A has a gimbal mounting arrangement within the read head window 59, due to the slight oversized vertical dimension of the aperture in bracket element 130. However, the gimballing action in this case is essentially controlled by the contact points 133 at the back of the case.

FIGS. 18-21 illustrate a method in accordance with this invention for injection molding a card reader case with an integrally molded card slot. As illustrated in FIG. 18 one step of the method involves forming a female mold section 180 which defines the outer front and side wall configuration of the case 52. Female mold section 180 includes a knife blade element 181 extending from one end wall to the other and partially through the mold section to define the outer bottom and side walls of the card slot. The blade includes upper and lower sections 182 and 183 which have an angled card lead-in configuration.

The central section 184 is thin, preferably about 1.5 millimeters at the bottom portion 184A and tapering down to about 1.30 millimeters at the top portion 184B. Top portion 184B, which defines the bottom of the physical card slot in the case, also has a small cutback portion on the right side to further narrow the bottom of the card slot in the region of the read head window. This forces the bottom portion of the credit card against the right hand side wall of the card slot when it is swiped past this location. The purpose of this is to ensure that the card is standing straight up in the slot as it is swiped past the magnetic read head and give good data reading sensitivity.

Another step of the injection molding method of this invention involves forming a male mold section 190 which has one portion defining the inner front and side wall configurations of the case such as portions 195 and 196 and a second portion 191 defining inner side and bottom walls of the card slot. This second portion includes a plurality of narrow buttress sections 193 regularly spaced from one end of the card slot to the other on opposite sides. These buttress sections are adapted to contact opposite edges of the knife blade in the female mold section when the two mold sections are mated together.

The process of this invention includes the steps of bringing the two mold sections together in mating relation and then injecting plastic material, preferably ABS plastic, into the void regions defined by the mold sections. During the injection process the buttress portions 193 on the male mold section support the knife blade throughout a substantial portion of the height of the blade to prevent blade distortion by the pressure of the plastic being injected into that region. This is shown in FIG. 20. Preferably at least about half of the height of the knife is held by the buttress sections. Four pairs of buttress sections are shown in FIG. 19 and in FIGS. 10 and 11 showing the physical configuration of the case. It has been found preferable to use a larger number of such buttress sections, e.g. up to eight opposing pairs spaced at fourteen millimeter intervals and having two different heights.

After the male and female mold sections have been separated and the molded case is ejected from the mold, it is preferable to place a knife-shaped insert 200 shown in FIG. 21 into the card slot while the case is completely cured in air to preclude distortion of the card slot. Without this insert, the slot configuration tends to distort during final curing due to differential curing rates at different regions.

The system and method of this invention enables the integral molded card slot to be formed within about fifteen millimeters of the right hand edge of the case and the read head to be mounted to the left of the card slot. The overall case may be made as small as 140×152 millimeters with a thickness, including cover and base of about 36 millimeters. The case size is dictated by the circuitry and other components to be housed within the case. The main contribution of this invention is to replace a space consuming, expensive dedicated card reader module with a more simple construction that is easier and less costly to manufacture.

The lower cost of a credit verification terminal designed and constructed in accordance with this invention has already proven an important contributor to acceptance of the credit verification technology by more retail establishments throughout the country.

It should be apparent that the above detailed description of specific embodiments of various features of the system and method of this invention is given by way of example only. Numerous modifications to specific features could be made by persons skilled in the art without departing from the principles of this invention as claimed in the following claims.

What is claimed is:

1. A method for injection molding a card reader case with an integrally formed card slot comprising the steps of:
   providing a female mold section having an interior cavity with walls which define the configuration of the front and side wall sections of said card reader case and including a knife blade element extending between opposing end walls of said interior cavity and partially through the depth of said interior cavity to define the configuration of bottom and side walls of said card slot, said knife blade element including a central section having a thin transverse dimension extending a substantial portion of the length of said knife blade element;
   providing a male mold section having one portion with exterior walls defining in cooperative relation with said interior cavity of said female mold section said configuration of front and side wall sections of said card reader case and a second portion comprising an interior cavity with walls which cooperate with said knife blade element of said female mold section to define said side and bottom walls of said card slot, said interior cavity including a projecting side wall section adapted to contact a central region of said knife blade element to define the configuration of a read head window in a central region of one of said side walls of said card slot, said interior cavity further including a plurality of pairs of narrow buttress sections projecting from opposite side walls of said interior cavity at regularly spaced intervals from one end of said interior cavity to the other end and adapted to contact opposite side walls of said knife blade element when said male mold section is mated with said female mold section;
   bringing said male and female mold sections together in mating relationship; and
   injecting plastic material into void regions within said mated mold sections; said narrow buttress sections supporting said knife blade element during the injection molding process to prevent distortion thereof and thereby to produce a well formed straight card slot in said molded case with narrow fenestrations in side walls of said card slot defined by said narrow buttress sections.

2. The method of claim 1, further comprising the steps of:
   partially curing said injected plastic material with said male and female mold sections mated together;
   separating said male and female mold sections;
   ejecting said molded card reader case from said female mold section; and
   placing a knife shaped insert into said card slot while said card reader case is curing to final hardness in air to preclude distortion of the walls of said card slot.

3. The method of claim 2, wherein said narrow buttress sections have a height dimension of a portion thereof which contacts said knife blade element corresponding substantially to at least about one-half the height dimension of said knife blade element.

4. A method for forming a cover portion of a housing for a point of sale terminal, said cover portion having a top wall section and four side wall sections and further having a card slot extending between a pair of opposing ones of said four side wall sections and having a bottom wall and opposing side walls, said method comprising the steps of:

provoking a female mold section having an interior cavity with a bottom wall section and four end wall sections which define the configuration of the top wall section and the four side wall sections of said cover portion and having a knife blade extending between an opposing pair of said end wall sections of said interior cavity and projecting from said bottom wall section partially through the depth of said interior cavity to define the configuration of the bottom wall and opposing side walls of said card slot, said knife blade including a central section having a thin transverse dimension extending throughout a major portion of the length thereof;

providing a male mold section having a male insert portion with a bottom wall section and four exterior side wall sections cooperating with said bottom wall section and said four end wall sections of said interior cavity of said female mold section to define said configuration of the top wall section and the four side wall sections of said cover portion, said male insert portion having formed therein an interior cavity with opposing side walls which cooperate with said knife blade of said female mold section to define the configuration of said bottom wall and opposing side walls of said card slot and having formed on said opposing side walls a plurality of pairs of directly opposing buttress sections projecting into said interior cavity at spaced intervals from one end of said interior cavity to the other end and being adapted to contact opposite side walls of said knife blade when said male mold section is mated with said female mold section;

bringing said male and female mold sections together in mating relationship; and injecting plastic material into void regions within said mated male and female mold sections; said directly opposing buttress sections supporting said knife blade during this plastic injection step to prevent distortion thereof and thereby to produce a well formed card slot with regular straight side walls having fenestrations therein defined by said directly opposing buttress sections.

5. The method of claim 4, further comprising the steps of:

partially curing said injected plastic material with said male and female mold sections mated together;

separating said male and female mold sections;

ejecting said molded cover portion from said female mold section; and placing a knife shaped insert into said card slot while said cover portion is curing to final hardness in air to preclude distortion of the walls of said card slot.

6. The method of claim 4, wherein said directly opposing buttress sections have a height dimension of a portion thereof which contacts said knife blade corresponding substantially to at least about one-half the height dimension of said knife blade.

7. The method of claim 4, adapted to form a cover portion of a housing with a read head window integrally formed in one of the opposing side walls of said card slot, wherein said step of providing a male mold section includes forming on one of said opposing side walls of said interior cavity in said male insert portion a central projecting element of length and width dimensions corresponding to the configuration of said read head window and being adapted to contact a central region of said knife blade to define the location and configuration of said read head window in a corresponding one of said opposing side walls of said card slot.

8. The method of claim 7, further comprising the steps of:

partially curing said injected plastic material with said male and female mold sections mated together;

separating said male and female mold sections;

ejecting said molded cover portion from said female mold section; and placing a knife shaped insert into said card slot while said cover portion is curing to final hardness in air to preclude distortion of the walls of said card slot.

9. The method of claim 7, wherein the region of said side wall in said interior cavity opposite said central projecting element has a buttress section projecting therefrom and cooperating with said central projecting element to stabilize said knife blade at that position, and said directly opposing buttress sections have a height dimension of a portion thereof which contacts said knife blade corresponding substantially to at least about one-half the height dimension of said knife blade.

10. The method of claim 9, further comprising the steps of:

partially curing said injected plastic material with said male and female mold sections mated together;

separating said male and female mold sections;

ejecting said molded cover portion from said female mold section; and placing a knife shaped insert into said card slot while said cover portion is curing to final hardness in air to preclude distortion of the walls of said card slot.

* * * * *